US007753774B2

(12) United States Patent
Gail et al.

(10) Patent No.: US 7,753,774 B2
(45) Date of Patent: Jul. 13, 2010

(54) USING MULTIPLE BINGO CARDS TO REPRESENT MULTIPLE SLOT PAYLINES AND OTHER CLASS III GAME OPTIONS

(75) Inventors: Ted Gail, Sparks, NV (US); Bryan D. Wolf, Reno, NV (US); Tracy Powell, Reno, NV (US); Justin M. Krum, Reno, NV (US)

(73) Assignee: IGT, Reno, NV (US)

( * ) Notice: Subject to any disclaimer, the term of this patent is extended or adjusted under 35 U.S.C. 154(b) by 677 days.

(21) Appl. No.: 11/402,726

(22) Filed: Apr. 11, 2006

(65) Prior Publication Data

US 2007/0155472 A1 Jul. 5, 2007

Related U.S. Application Data

(60) Provisional application No. 60/752,014, filed on Dec. 19, 2005.

(51) Int. Cl.
*A63F 13/00* (2006.01)

(52) U.S. Cl. ............................ 463/20; 463/19; 463/18; 463/17; 463/16; 463/13; 463/12; 273/269

(58) Field of Classification Search .................. 463/12, 463/13, 16, 17, 18, 19, 20; 273/236, 237, 273/269, 143 R, 121 B
See application file for complete search history.

(56) References Cited

U.S. PATENT DOCUMENTS 3,671,041 A * 6/1972 Taylor et al. ................ 273/237
4,332,389 A 6/1982 Loyd, Jr. et al.
4,365,810 A 12/1982 Richardson
4,373,726 A 2/1983 Churchill et al.

(Continued)

FOREIGN PATENT DOCUMENTS

WO 01/99067 12/2001

(Continued)

OTHER PUBLICATIONS

International Search Report, mailed Jul. 6, 2007 from International Application No. PCT/US2006/048264, 5 pp including Notification of Transmittal.

(Continued)

*Primary Examiner*—Dmitry Suhol
*Assistant Examiner*—Thomas H Henry
(74) *Attorney, Agent, or Firm*—Weaver Austin Villeneuve & Sampson LLP

(57) ABSTRACT

Methods, devices and systems are described for mapping a variety of Class III game outcomes to a common set of bingo patterns. Each game theme may have a different entertaining display, based upon a corresponding Class III game. Preferably, each game theme will offer game play and paytable percentages closely matching those of the original Class III game. In order to more closely match Class III game play, some implementations provide a system wherein the hit frequency of a bingo game will be modulated according to Class III game options selected by a player. The options may be, for example, paylines of a simulated slot game. In preferred implementations, this modulation is accomplished by varying the number of bingo cards provided in the underlying bingo game according to the options (e.g., the number of paylines) selected.

7 Claims, 16 Drawing Sheets

U.S. PATENT DOCUMENTS

| | | | | |
|---|---|---|---|---|
| 4,455,025 A | | 6/1984 | Itkis | |
| 4,624,462 A | | 11/1986 | Itkis | |
| 4,798,387 A | | 1/1989 | Richardson | |
| 4,848,771 A | | 7/1989 | Richardson | |
| 4,856,787 A | | 8/1989 | Itkis | |
| 5,007,649 A | | 4/1991 | Richardson | |
| 5,192,076 A | * | 3/1993 | Komori | 463/18 |
| 5,242,163 A | | 9/1993 | Fulton | |
| 5,297,802 A | | 3/1994 | Pocock et al. | |
| 5,351,970 A | | 10/1994 | Fioretti | |
| 5,393,057 A | | 2/1995 | Marnell, II | |
| 5,639,088 A | | 6/1997 | Schneider et al. | |
| 5,833,540 A | | 11/1998 | Miodunski et al. | |
| 5,967,895 A | | 10/1999 | Kellen | |
| 6,012,984 A | | 1/2000 | Roseman | |
| 6,089,978 A | * | 7/2000 | Adams | 463/20 |
| 6,093,100 A | | 7/2000 | Singer et al. | |
| 6,149,156 A | | 11/2000 | Feola | |
| 6,159,095 A | | 12/2000 | Frohm et al. | |
| 6,168,521 B1 | | 1/2001 | Luciano et al. | |
| 6,183,361 B1 | | 2/2001 | Cummings et al. | |
| 6,280,325 B1 | | 8/2001 | Fisk | |
| 6,524,185 B2 | | 2/2003 | Lind | |
| 6,537,150 B1 | | 3/2003 | Luciano | |
| 6,569,017 B2 | | 5/2003 | Enzminger et al. | |
| 6,656,040 B1 | | 12/2003 | Brosnan et al. | |
| 6,656,044 B1 | | 12/2003 | Lewis | |
| 6,802,776 B2 | | 10/2004 | Lind et al. | |
| 6,840,858 B2 | | 1/2005 | Adams | |
| 2002/0013170 A1 | | 1/2002 | Miller et al. | |
| 2002/0113369 A1 | | 8/2002 | Weingardt | |
| 2002/0132661 A1 | * | 9/2002 | Lind et al. | 463/19 |
| 2003/0125101 A1 | | 7/2003 | Campo | |
| 2004/0072619 A1 | | 4/2004 | Brosnan et al. | |
| 2004/0077402 A1 | | 4/2004 | Schlottmann | |
| 2005/0014553 A1 | | 1/2005 | Byrne | |
| 2005/0233798 A1 | | 10/2005 | Van Asdale | |
| 2005/0233799 A1 | | 10/2005 | Lemay | |
| 2006/0025199 A1 | | 2/2006 | Harkins et al. | |
| 2006/0287058 A1 | | 12/2006 | Resnick et al. | |
| 2007/0155471 A1 | | 7/2007 | Powell et al. | |
| 2007/0161423 A1 | | 7/2007 | Bienvenue et al. | |
| 2007/0173313 A1 | * | 7/2007 | Bienvenue | 463/18 |

FOREIGN PATENT DOCUMENTS

| | | |
|---|---|---|
| WO | WO 01/99067 | 12/2001 |
| WO | WO 03/085613 | 10/2003 |
| WO | 2004/095383 A1 | 4/2004 |
| WO | WO2006/039324 | 4/2006 |
| WO | 2007/075401 | 7/2007 |
| WO | 2007/075486 | 7/2007 |
| WO | 2007/075582 | 7/2007 |
| WO | 2007/078828 | 7/2007 |
| WO | 2008-005276 | 1/2008 |
| WO | WO2008/005278 | 1/2008 |

OTHER PUBLICATIONS

Written Opinion of the International Searching Authority, mailed Jul. 6, 2007 from International Application No. PCT/US2006/048264, 7 pp.

Powell et al., U.S. Appl. No. 11/442,029, "Bingo System With Discrete Payout Categories", filed May 26, 2006.

International Search Report and Written Opinion of the International Searching Authority, mailed Jul. 4, 2007 from International Application No. PCT/US2006/047714, 11 pp including Notification of Transmittal.

PCT patent application No. PCT/US2006/048064, International Search Report and Written Opinion dated Jul. 5, 2007.

International Search Report, mailed Aug. 8, 2007 from International Application No. PCT/US2006/047887, 5 pp. including Notification of Transmittal.

Written Opinion of the International Searching Authority, mailed Aug. 8, 2007 from International Application No. PCT/US2006/047887, 7 pp,.

Bienvenue et al., U.S. Appl. No. 11/312,966, "Bingo System With Downloadable Common Patterns", filed Dec. 19, 2005.

Powell et al., U.S. Appl. No. 11/312,948, "Bingo Gaming Machine Capable of Selecting Different Bingo Pools", filed Dec. 19, 2005.

US Office Action mailed Feb. 2, 2009 from U.S. Appl. No. 11/339,234.

International Preliminary Report on Patentability and Written Opinion dated Aug. 8, 2007, issued in WO2007/075401.

International Preliminary Report on Patentability and Written Opinion dated Jul. 5, 2007, issued in WO2007/075486.

International Preliminary Report on Patentability and Written Opinion dated Jul. 4, 2007, issued in WO2007/078828.

International Preliminary Report on Patentability and Written Opinion dated Jun. 6, 2007, issued in WO2007/075582.

International Preliminary Report on Patentability and Written Opinion dated February 2, 2008, issued in WO2008/005276.

International Search Report and Written Opinion dated Feb. 12, 2008, issued in WO2008/005278, Intl App No. PCT/US2007/015015.

International Preliminary Report on Patentability and Written Opinion, dated Jan. 6, 2009, issued in WO2008/005278, Intl App No. PCT/US2007/015015.

* cited by examiner

| 20-Payline Slot game Paylines | Hit Frequency | Bingo Game Cards | Hit Frequency | Difference |
|---|---|---|---|---|
| 1 | 5.091% | 1 | 5.091% | 0.000% |
| 2 | 8.697% | 2 | 9.923% | 1.227% |
| 3 | 12.280% | 3 | 14.509% | 2.230% |
| 4 | 15.479% | 4 | 18.861% | 3.383% |
| 5 | 18.685% | 5 | 22.993% | 4.308% |
| 6 | 19.829% | 6 | 26.912% | 7.085% |
| 7 | 20.856% | 7 | 30.633% | 9.779% |
| 8 | 23.460% | 8 | 34.165% | 10.706% |
| 9 | 25.879% | 9 | 37.516% | 11.639% |
| 10 | 26.676% | 10 | 40.697% | 14.024% |
| 11 | 27.452% | 11 | 43.716% | 16.267% |
| 12 | 28.403% | 12 | 46.582% | 18.182% |
| 13 | 29.466% | 13 | 49.301% | 19.838% |
| 14 | 30.334% | 14 | 51.882% | 21.551% |
| 15 | 31.237% | 15 | 54.332% | 23.098% |
| 16 | 31.417% | 16 | 56.657% | 25.243% |
| 17 | 31.465% | 17 | 58.864% | 27.357% |
| 18 | 31.502% | 18 | 60.958% | 29.459% |
| 19 | 31.510% | 19 | 62.946% | 31.483% |
| 20 | 31.652% | 20 | 64.832% | 33.183% |
| | | | Maximum difference | 33.180% |
| | | | Average difference | 15.500% |

305 310 315 320 325 330 335

300

Fig. 3

| 20-Payline Slot game | | Bingo Game | | |
|---|---|---|---|---|
| Paylines | Hit Frequency | Cards | Hit Frequency | Difference |
| 1 | 5.091% | 1 | 5.091% | 0.000% |
| 2 | 8.697% | 1 | 5.091% | -3.605% |
| 3 | 12.280% | 2 | 9.924% | -2.356% |
| 4 | 15.479% | 2 | 9.924% | -5.556% |
| 5 | 18.685% | 3 | 14.510% | -4.175% |
| 6 | 19.829% | 3 | 14.510% | -5.320% |
| 7 | 20.856% | 4 | 18.862% | -1.993% |
| 8 | 23.460% | 4 | 18.862% | -4.598% |
| 9 | 25.879% | 5 | 22.993% | -2.886% |
| 10 | 26.676% | 5 | 22.993% | -3.682% |
| 11 | 27.452% | 6 | 26.914% | -0.538% |
| 12 | 28.403% | 6 | 26.914% | -1.489% |
| 13 | 29.466% | 7 | 30.635% | 1.169% |
| 14 | 30.334% | 7 | 30.635% | 0.301% |
| 15 | 31.237% | 8 | 34.165% | 2.928% |
| 16 | 31.417% | 8 | 34.165% | 2.748% |
| 17 | 31.465% | 9 | 37.516% | 6.051% |
| 18 | 31.502% | 9 | 37.516% | 6.014% |
| 19 | 31.510% | 10 | 40.697% | 9.187% |
| 20 | 31.652% | 10 | 40.697% | 9.045% |
| | | | Maximum difference | 9.187% |
| | | | Average difference | 3.683% |

425, 430, 435

400

Fig. 4

| Credits Bet | Slot Paylines | Credits Bet on Each Bingo Card | | | | | | | | | |
|---|---|---|---|---|---|---|---|---|---|---|---|
| | | 1 | 2 | 3 | 4 | 5 | 6 | 7 | 8 | 9 | 10 |
| 1 | 1 | 1 | | | | | | | | | |
| 2 | 2 | 2 | | | | | | | | | |
| 3 | 3 | 2 | 1 | | | | | | | | |
| 4 | 4 | 2 | 2 | | | | | | | | |
| 5 | 5 | 2 | 2 | 1 | | | | | | | |
| 6 | 6 | 2 | 2 | 2 | | | | | | | |
| 7 | 7 | 2 | 2 | 2 | 1 | | | | | | |
| 8 | 8 | 2 | 2 | 2 | 2 | | | | | | |
| 9 | 9 | 2 | 2 | 2 | 2 | 1 | | | | | |
| 10 | 10 | 2 | 2 | 2 | 2 | 2 | | | | | |
| 11 | 11 | 2 | 2 | 2 | 2 | 2 | 1 | | | | |
| 12 | 12 | 2 | 2 | 2 | 2 | 2 | 2 | | | | |
| 13 | 13 | 2 | 2 | 2 | 2 | 2 | 2 | 1 | | | |
| 14 | 14 | 2 | 2 | 2 | 2 | 2 | 2 | 2 | | | |
| 15 | 15 | 2 | 2 | 2 | 2 | 2 | 2 | 2 | 1 | | |
| 16 | 16 | 2 | 2 | 2 | 2 | 2 | 2 | 2 | 2 | | |
| 17 | 17 | 2 | 2 | 2 | 2 | 2 | 2 | 2 | 2 | 1 | |
| 18 | 18 | 2 | 2 | 2 | 2 | 2 | 2 | 2 | 2 | 2 | |
| 19 | 19 | 2 | 2 | 2 | 2 | 2 | 2 | 2 | 2 | 2 | 1 |
| 20 | 20 | 2 | 2 | 2 | 2 | 2 | 2 | 2 | 2 | 2 | 2 |

*Fig. 5*

| 20-Payline Slot game | | Bingo Game | | |
|---|---|---|---|---|
| Paylines | Hit Frequency | Cards | Hit Frequency | Difference |
| 1 | 5.091% | 1 | 5.091% | 0.000% |
| 2 | 8.697% | 1 | 5.091% | -3.605% |
| 3 | 12.280% | 1 | 5.091% | -7.188% |
| 4 | 15.479% | 2 | 9.924% | -5.556% |
| 5 | 18.685% | 2 | 9.924% | -8.761% |
| 6 | 19.829% | 2 | 9.924% | -9.906% |
| 7 | 20.856% | 3 | 14.510% | -6.346% |
| 8 | 23.460% | 3 | 14.510% | -8.951% |
| 9 | 25.879% | 3 | 14.510% | -11.370% |
| 10 | 26.676% | 4 | 18.862% | -7.813% |
| 11 | 27.452% | 4 | 18.862% | -8.589% |
| 12 | 28.403% | 4 | 18.862% | -9.541% |
| 13 | 29.466% | 5 | 22.993% | -6.473% |
| 14 | 30.334% | 5 | 22.993% | -7.340% |
| 15 | 31.237% | 5 | 22.993% | -8.243% |
| 16 | 31.417% | 6 | 26.912% | -4.505% |
| 17 | 31.465% | 6 | 26.912% | -4.553% |
| 18 | 31.502% | 6 | 26.912% | -4.590% |
| 19 | 31.510% | 7 | 30.633% | -0.877% |
| 20 | 31.652% | 7 | 30.633% | -1.019% |
| | | Maximum difference | 11.370% | |
| | | Average difference | 6.262% | |

625

630

635

600

Fig. 6

700

| Credits Bet (705) | Slot Paylines (710) | Credits Bet on Each Bingo Card (715) | | | | | | (720) |
|---|---|---|---|---|---|---|---|---|
| | | 1 | 2 | 3 | 4 | 5 | 6 | 7 |
| 1 | 1 | 1 | | | | | | |
| 2 | 2 | 2 | | | | | | |
| 3 | 3 | 3 | | | | | | |
| 4 | 4 | 3 | 1 | | | | | |
| 5 | 5 | 3 | 2 | | | | | |
| 6 | 6 | 3 | 3 | | | | | |
| 7 | 7 | 3 | 3 | 1 | | | | |
| 8 | 8 | 3 | 3 | 2 | | | | |
| 9 | 9 | 3 | 3 | 3 | | | | |
| 10 | 10 | 3 | 3 | 3 | 1 | | | |
| 11 | 11 | 3 | 3 | 3 | 2 | | | |
| 12 | 12 | 3 | 3 | 3 | 3 | | | |
| 13 | 13 | 3 | 3 | 3 | 3 | 1 | | |
| 14 | 14 | 3 | 3 | 3 | 3 | 2 | | |
| 15 | 15 | 3 | 3 | 3 | 3 | 3 | | |
| 16 | 16 | 3 | 3 | 3 | 3 | 3 | 1 | |
| 17 | 17 | 3 | 3 | 3 | 3 | 3 | 2 | |
| 18 | 18 | 3 | 3 | 3 | 3 | 3 | 3 | |
| 19 | 19 | 3 | 3 | 3 | 3 | 3 | 3 | 1 |
| 20 | 20 | 3 | 3 | 3 | 3 | 3 | 3 | 2 |

*Fig. 7*

| 20-Payline Slot game | | Bingo Game | | |
|---|---|---|---|---|
| Paylines | Hit Frequency | Cards | Hit Frequency | Difference |
| 1 | 5.091% | 1 | 5.091% | 0.000% |
| 2 | 8.697% | 2 | 9.923% | 1.226% |
| 3 | 12.280% | 3 | 14.509% | 2.229% |
| 4 | 15.479% | 3 | 14.509% | -0.970% |
| 5 | 18.685% | 4 | 18.861% | 0.176% |
| 6 | 19.829% | 4 | 18.861% | -0.968% |
| 7 | 20.856% | 4 | 18.861% | -1.995% |
| 8 | 23.460% | 5 | 22.992% | -0.468% |
| 9 | 25.879% | 6 | 26.912% | 1.033% |
| 10 | 26.676% | 6 | 26.912% | 0.236% |
| 11 | 27.452% | 6 | 26.912% | -0.540% |
| 12 | 28.403% | 6 | 26.912% | -1.491% |
| 13 | 29.466% | 7 | 30.633% | -1.167% |
| 14 | 30.334% | 7 | 30.633% | 0.299% |
| 15 | 31.237% | 7 | 30.633% | -0.604% |
| 16 | 31.417% | 7 | 30.633% | -0.784% |
| 17 | 31.465% | 7 | 30.633% | -0.832% |
| 18 | 31.502% | 7 | 30.633% | -0.869% |
| 19 | 31.510% | 7 | 30.633% | -0.877% |
| 20 | 31.652% | 7 | 30.633% | -1.019% |
| | | Maximum difference | 2.229% | |
| | | Average difference | 0.889% | |

825 830 835 800

Fig. 8

| Credits Bet (905) | Slot Paylines (910) | Credits Bet on Each Bingo Card (915) | | | | | | |
|---|---|---|---|---|---|---|---|---|
| | | 1 | 2 | 3 | 4 | 5 | 6 | 7 (920) |
| 1 | 1 | 1 | | | | | | |
| 2 | 2 | 1 | 1 | | | | | |
| 3 | 3 | 1 | 1 | 1 | | | | |
| 4 | 4 | 2 | 1 | 1 | | | | |
| 5 | 5 | 2 | 1 | 1 | 1 | | | |
| 6 | 6 | 2 | 2 | 1 | 1 | | | |
| 7 | 7 | 2 | 2 | 2 | 1 | | | |
| 8 | 8 | 2 | 2 | 2 | 1 | 1 | | |
| 9 | 9 | 2 | 2 | 2 | 1 | 1 | 1 | |
| 10 | 10 | 2 | 2 | 2 | 2 | 1 | 1 | |
| 11 | 11 | 2 | 2 | 2 | 2 | 2 | 1 | |
| 12 | 12 | 2 | 2 | 2 | 2 | 2 | 2 | |
| 13 | 13 | 2 | 2 | 2 | 2 | 2 | 2 | 1 |
| 14 | 14 | 2 | 2 | 2 | 2 | 2 | 2 | 2 |
| 15 | 15 | 3 | 2 | 2 | 2 | 2 | 2 | 2 |
| 16 | 16 | 3 | 3 | 2 | 2 | 2 | 2 | 2 |
| 17 | 17 | 3 | 3 | 3 | 2 | 2 | 2 | 2 |
| 18 | 18 | 3 | 3 | 3 | 3 | 2 | 2 | 2 |
| 19 | 19 | 3 | 3 | 3 | 3 | 3 | 2 | 2 |
| 20 | 20 | 3 | 3 | 3 | 3 | 3 | 3 | 2 |

900

*Fig. 9*

1000

| Bingo Game (1005) | | Slot Game (1010) | | (1020) |
|---|---|---|---|---|
| Paylines | Hit Frequency | Cards | Hit Frequency | Difference |
| 2 | 8.697% | 1 | 5.091% | -3.606% |
| 4 | 15.479% | 2 | 9.923% | -5.556% |
| 6 | 19.829% | 3 | 14.509% | -5.320% |
| 8 | 23.460% | 4 | 18.861% | -4.599% |
| 10 | 26.676% | 5 | 22.992% | -3.684% |
| 12 | 28.403% | 6 | 26.912% | -1.491% |
| 14 | 30.334% | 7 | 30.633% | 0.299% |
| 16 | 31.417% | 8 | 34.165% | 2.748% |
| 18 | 31.502% | 9 | 37.516% | 6.014% |
| 20 | 31.652% | 10 | 40.697% | 9.045% |
| | | Average Difference | 4.236% (1030) | |
| | | Max Difference | 9.045% (1035) | |
| | | | | |

Fig. 10

1100

| Credits Bet (1105) | Paylines (1110) | Card Number (1115) | Credits per Card (1120) | Card wins multiplied by (1125) |
|---|---|---|---|---|
| 2 | 2 | 1 | 2 | 2 |
| 4 | 4 | 1 | 2 | 2 |
| | | 2 | 2 | 2 |
| 6 | 6 | 1 | 2 | 2 |
| | | 2 | 2 | 2 |
| | | 3 | 2 | 2 |
| 8 | 8 | 1 | 2 | 2 |
| | | 2 | 2 | 2 |
| | | 3 | 2 | 2 |
| | | 4 | 2 | 2 |
| 10 | 10 | 1 | 2 | 2 |
| | | 2 | 2 | 2 |
| | | 3 | 2 | 2 |
| | | 4 | 2 | 2 |
| | | 5 | 2 | 2 |

*Fig. 11*

USING MULTIPLE BINGO CARDS TO REPRESENT MULTIPLE SLOT PAYLINES AND OTHER CLASS III GAME OPTIONS

This application claims priority to U.S. Provisional Patent Application No. 60/752,014, entitled "BINGO GAMES THAT PROVIDE SIMULATED CLASS III GAME OUTCOMES" and filed on Dec. 19, 2005, which is hereby incorporated by reference.

BACKGROUND OF THE INVENTION

The present disclosure relates to gaming networks and, more particularly, to gaming networks for providing multi-player bingo games.

Gaming in the United States is divided into Class I, Class II and Class III games. Class I gaming includes social games played for minimal prizes, or traditional ceremonial games. Class II gaming includes bingo and bingo-like games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Such an arrangement will sometimes be referred to herein as a "game-winning pattern" or a "game-ending pattern." Class II gaming may also include pull tab games if played in the same location as bingo games, lotto, punch boards, tip jars, instant bingo, and other games similar to bingo. Class III gaming includes any game that is not a Class I or Class II game, such as a game of chance of the kind typically offered in non-Indian, state-regulated casinos.

Two basic forms of bingo exist. In traditional bingo, the players purchase cards after which a draw takes place. The first player to achieve a designated pattern wins. In one type of bingo game known as Bonanza Bingo, the draw for the game takes place before the players know the arrangements on their bingo cards. After the draw occurs, the players may purchase cards and compare the arrangements on the cards to the drawn numbers to determine whether predetermined patterns are matched. Play continues in Bonanza Bingo until at least one of the players matches a designated game-winning pattern. Bonanza Bingo may also encompass bingo variations wherein a partial draw is conducted for some numbers (generally fewer than the number of balls expected to be necessary to win the game) prior to selling the bingo cards. After the bingo cards are sold, additional numbers are drawn until there is a winner.

In a typical bingo game, a "ball drop" display indicates randomly-drawn numbers to be used in playing the bingo game. Accordingly, the term "ball drop" or the like will be used herein to signify the random selection of numbers used in a bingo game; accordingly, the numbers themselves will often be referred to as "balls." Those of skill in the art will realize that the numbers used in an electronic bingo game may be displayed in any convenient fashion and that a simulated "ball drop" is merely one such example. The number of balls drawn and the timing of the ball drops may vary according to the type of bingo game.

As indicated above, a bingo game is played until at least one player covers a predetermined game-winning pattern on the player's bingo card. The game may also include interim winners of prizes based on matching predetermined interim patterns on the bingo card using the same ball draw. The interim pattern wins do not terminate the bingo game. For interim pattern awards, players covering certain interim patterns may receive an additional award as the game continues. Some exceptional bingo versions may allow bingo draws beyond those needed to achieve the bingo game win so as to pay out interim pattern wins at a desired rate. The game-winning awards are generally pari-mutuel in nature. That is, the bingo win award is based upon the total amount wagered on a given occurrence of the bingo game. However, interim pattern awards typically are not pari-mutuel.

Gaming machines such as slot machines and video poker machines have proven to be very popular. However, many games of chance that are played on gaming machines fall into the category of Class III games, which may be subject to stricter approval and regulation. Many gaming establishments have a limited number of gaming machines for playing Class III games and a greater number of gaming machines for playing Class II games, such as bingo.

As such, it would be desirable to provide a gaming system wherein a Class II game may be played on a gaming machine with at least some of the "look and feel" of a Class III game. For example, prior art systems have failed to provide a bingo game on a network of gaming machines that satisfies the regulatory requirements for a Class II game while simulating important aspects of a Class III game.

SUMMARY OF THE INVENTION

Novel methods, devices and systems are described for mapping a variety of Class III game outcomes to a common set of bingo patterns. Each game theme may have a different entertaining display, based upon a corresponding Class III game. Preferably, each game theme will offer game play and paytable percentages closely matching those of the original Class III game. In order to more closely match Class III game play, some implementations provide a system wherein the hit frequency of a bingo game will be modulated according to Class III game options selected by a player. The options may be, for example, paylines of a simulated slot game. In preferred implementations, this modulation is accomplished by varying the number of bingo cards provided in the underlying bingo game according to the number of Class III game options (e.g., the number of paylines) selected.

Some embodiments of the invention provide a gaming machine. The gaming machine includes components for providing a bingo game that simulates a Class III game having from 1 to P possible options for changing hit frequency. The gaming machine also includes components for providing from 1 to B bingo cards for playing the bingo game, wherein the number of bingo cards depends on the option selected by a player. In alternative embodiments, the number of options depends on the number of bingo cards selected by a player. The Class III game may be, for example, a slot game, a roulette game, a keno game or a poker game. The options may be, for example, a number of paylines for a simulated slot game, a number of hands for a simulated poker game, a number of spots picked for a simulated keno game or a number of wagers placed on a simulated roulette game.

Alternative embodiments of the invention also provide a gaming machine. The gaming machine is configured for providing a bingo game that simulates a slot game. The gaming machine includes the following components: a network interface; a first display device for displaying the bingo game; a second display device for displaying a simulated slot game; a pay device for accepting indicia of credit; at least one user input device. The gaming machine also includes at least one logic device configured to perform the following steps: receive an indication of sufficient credit for the bingo game from the pay device; receive an indication from a user input device to play P paylines in the simulated slot game; ascertain a number B of bingo cards for the bingo game, wherein B is ascertained according to P; control the first display device to display B bingo cards; control the first display device to indicate hits on the B bingo cards according to bingo game data received via the network interface; determine a first outcome of the bingo game; control the first display device to display the first outcome; determine a second outcome of the slot game; and control the second display device to display the second outcome. The ascertaining step may involve referencing a data structure wherein B≦P or referencing a data structure wherein B=P.

Some implementations of the gaming machine are configured as follows: each payline of the slot game corresponds with a slot hit frequency; each bingo card of the slot game corresponds with a bingo hit frequency; the absolute value of an average difference between each slot hit frequency and each corresponding bingo hit frequency equals D; and the ascertaining step comprises referencing a data structure wherein paylines are associated with bingo cards such that D is minimized.

Other implementations of the gaming machine are configured as follows: each payline of the slot game corresponds with a slot hit frequency; each bingo card of the slot game corresponds with a bingo hit frequency; the absolute value of a difference between a slot hit frequency of a selected slot payline and a corresponding bingo hit frequency equals $D_S$; and the ascertaining step comprises referencing a data structure wherein paylines are associated with bingo cards such that $D_S$ is minimized. The selected slot payline may, for example, be selected according to historical player preference data, maybe a maximum slot payline, etc.

The ascertaining step may involve determining whether P is an odd number or an even number and setting B equal to P/2 when P is an even number. The ascertaining may involve: determining whether P is an odd number or an even number; and, when P is an odd number, determining whether P=1.14. The ascertaining step may further involve setting B equal to P when P=1 and/or setting B equal to (P+1)/2 when P≠1.

The ascertaining step can involve determining whether P is a multiple of 3. The ascertaining step may further involve setting B equal to P/3 when P is a multiple of 3 and/or setting B equal to N/3 when P is not a multiple of 3, wherein N is a multiple of 3 greater than P and less than P+3.

Some implementations of the invention provide a gaming method that includes the following steps: providing a bingo game that simulates a slot game having from 1 to P possible paylines; and providing from 1 to B bingo cards for playing the bingo game, a number of bingo cards provided depending on a number of paylines selected by a player and wherein B≦P.

Alternative gaming methods of the invention include the following steps: determining numbers of bingo cards B to assign to each of a plurality of Class III game options P for modulating hit frequency in a Class III game; and forming a data structure indicating a correspondence between the numbers of bingo cards and each of the Class III game options. The Class III game may, for example, be a slot game, a roulette game, a keno game or a poker game. The Class III game options may, for example, involve a number of paylines for a simulated slot game, a number of hands for a simulated poker game, a number of spots picked for a simulated keno game and a number of wagers placed on a simulated roulette game.

The determining step may involve determining how a first hit frequency of the bingo game will increase as a second hit frequency of the Class III game increases. The determining step may involve setting B≦P or setting B=P.

The gaming method may include the following steps: providing the data structure to a plurality of gaming machines; providing a bingo game that simulates a Class III game, wherein a player is provided with P Class III game options and plays the bingo game with corresponding B bingo cards; and simulating the Class III game outcome according to a bingo game outcome.

In some implementations of the method, the following is true: each payline of the slot game corresponds with a slot hit frequency; each bingo card of the slot game corresponds with a bingo hit frequency; the absolute value of an average difference between each slot hit frequency and each corresponding bingo hit frequency equals D; and the determining step comprises associating paylines with bingo cards such that D is minimized.

In alternative implementations of the method, the following is true: each payline of the slot game corresponds with a slot hit frequency; each bingo card of the slot game corresponds with a bingo hit frequency; the absolute value of a difference between a slot hit frequency of a selected slot payline and a corresponding bingo hit frequency equals $D_S$; and the determining step comprises associating paylines with bingo cards such that $D_S$ is minimized. The selected slot payline may, for example, be selected according to historical player preference data. Alternatively, the selected slot payline may be a maximum slot payline.

The determining step may involve determining whether P is an odd number or an even number and setting B equal to P/2 when P is an even number. When P is an odd number, the determining step may involve determining whether P=1. The determining step may further comprise setting B equal to P when P=1. The determining step may involve setting B equal to (P+1)/2 when P≠1.

The determining step may involve determining whether P is a multiple of 3. The method may further involve setting B equal to P/3 when P is a multiple of 3. The method may involve setting B equal to N/3 when P is not a multiple of 3, wherein N is a multiple of 3 greater than P and less than P+3.

Alternative embodiments of the invention provide a gaming machine that includes the following components: a network interface; a first display device for displaying the bingo game; a second display device for displaying a simulated slot game; a pay device for accepting indicia of credit; at least one user input device. The gaming machine also includes at least one logic device configured to perform the following steps: receive an indication of sufficient credit for the bingo game from the pay device; receive an indication from a user input device that a player has selected a number B of bingo cards for the bingo game a number B of bingo cards for the bingo game; ascertain a number P of paylines for the simulated game, wherein P is ascertained according to B; control the first display device to display B bingo cards; control the first display device to indicate hits on the B bingo cards according to bingo game data received via the network interface; determine a first outcome of the bingo game; control the first display device to display the first outcome; determine a second outcome of the slot game; and control the second display device to display the second outcome.

The present invention provides hardware (such as gaming machines, network devices and components of such devices) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

FIG. 3 is a table of Class III gaming options, numbers of bingo cards and hit frequencies that illustrates one aspect of the invention.

FIG. 4 is a table of table of Class III gaming options, numbers of bingo cards and hit frequencies that illustrates another aspect of the invention.

FIG. 5 is a table indicating bet distributions among the bingo cards of FIG. 4 according to some aspects of the invention.

FIG. 6 is a table of table of Class III gaming options, numbers of bingo cards and hit frequencies that illustrates still other aspects of the invention.

FIG. 7 is a table indicating bet distributions among the bingo cards of FIG. 6 according to some aspects of the invention.

FIG. 8 is a table of table of Class III gaming options, numbers of bingo cards and hit frequencies that illustrates yet other aspects of the invention.

FIG. 9 is a table indicating bet distributions among the bingo cards of FIG. 8 according to some aspects of the invention.

FIG. 10 is a table of table of Class III gaming options, numbers of bingo cards and hit frequencies that illustrates further aspects of the invention.

FIG. 11 is a table indicating bet distributions among the bingo cards of FIG. 10 according to some aspects of the invention.

DETAILED DESCRIPTION OF THE INVENTION

Figure 1:
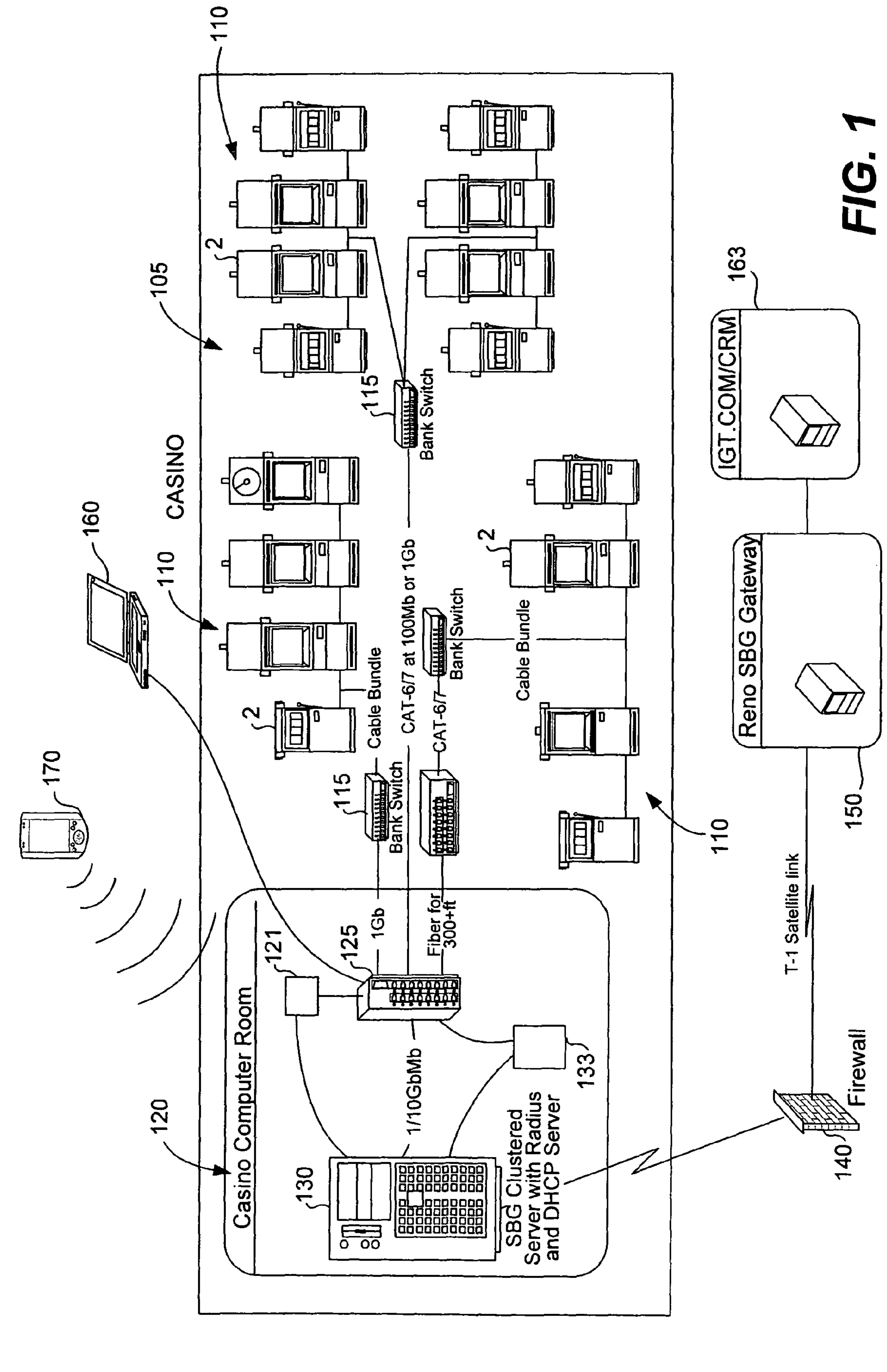
FIG. 1 illustrates one example of a network topology for implementing some aspects of the present invention.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Overview of Providing Class II Games That Simulate Class III Games Various methods and devices will be described herein for presenting Class II games (primarily bingo games) with entertaining displays that simulate Class III games. According to some such implementations, bingo players may choose from a variety of Class III game themes, each theme having a different entertaining display adapted from a corresponding Class III game. Preferably, each Class III game theme will offer play and win dynamics and paytable percentages closely matching those of the original Class III game.

The following applications describe pertinent material and are hereby incorporated by reference: U.S. patent application Ser. No. 10/925,710, entitled "Draw Bingo" and filed on Aug. 24, 2004; U.S. patent application Ser. No. 10/937,227, entitled "Bingo Game Morphed to Display Non-Bingo Outcomes" and filed on Sep. 8, 2004; U.S. patent application Ser. No. 11/149,828, entitled "Perrius Poker and Other Bingo Game Variations" and filed on Jun. 10, 2005; This application is related to U.S. patent application Ser. No. 11/312,966, entitled "Bingo System with Downloadable Common Patterns" and filed on Dec. 19, 2005; and U.S. patent application Ser. No. 11/312,948, entitled "Bingo Gaming Machine Capable of Selecting Different Bingo Pools" and filed on Dec. 19, 2005 (the "Bingo Pools Application"), collectively, the "Class II/Class III Applications."

As described in the foregoing applications, providing Class II games that simulate Class III games presents a number of challenges. One of these challenges is to implement such systems while complying with an evolving regulatory framework. It is expected, for example, that Class II regulations will soon require that all gaming machines participating in a single bingo game have the same bingo paytable (the same patterns with the same corresponding probabilities and payouts). This would mean, for example, that an "X" bingo pattern that pays 10 credits and has a 5% probability of occurring in one game, the pattern must pay 10 credits and have a 5% probability of occurring for all games participating in the same bingo pool.

As described in the Bingo Pools Application, such requirements introduce further challenges for Class II games that simulate Class III games having a number of player options that will sometimes be referred to herein as "Class III game options" or the like. Class III game options may be, e.g., the number of paylines in a simulated slot game, a number of hands in a simulated video poker game, a number of spots picked for a simulated keno game or a number of wagers placed on a simulated roulette game. However, in part because of the popularity of slot games, the most commonly referenced Class III game options herein are paylines for simulated slot games.

In a typical Class III slot game, the paytable changes based on the number of paylines played. A player playing one line expects all wins to be a multiple of his wager. Increasing the number of lines played increases the "hit frequency" but reduces the average payout size. Accordingly, players can play longer but are less likely to have substantial payouts when they do win. For example, a player playing 10 paylines expects some wins that are less than his wager (sometimes referred to as "dribble pays" or "cherry dribblers"), but that allow the player to continue playing longer than if only 1 payline were being played. Playing a large number of paylines appeals to players who desire a smooth, low-volatility game that they can play for a relatively long time. On the other hand, playing a small number of paylines appeals to players who prefer a higher-volatility game with less frequent but larger payouts.

In order to comply with the anticipated Class II regulations and more closely match Class III game play, some implementations described in the Bingo Pools Application provide a system wherein separate paytables and bingo pools are formed according to the number of Class III game options. For example, separate paytables and bingo pools may be formed according to the number of paylines played on slot-type game themes and/or the number of hands played on poker game themes. In some such implementations, players will be limited to predetermined numbers of lines (or hands) played, e.g., only 1, 3, 5 or 9 lines. In alternative implementations, a player's options regarding the number of lines played will depend, at least in part, on how many other players are playing any given number of lines on a slot game.

In order to have as many machines as possible participating in the same bingo game, it may be desirable to allow the hit frequency of the game to change when a player selects options of a simulated Class III game (e.g., selects to play more paylines) without switching to a different bingo pool or paytable. Accordingly, the present invention provides gaming methods and devices wherein the hit frequency of a bingo game will be modulated by assigning differing numbers of bingo cards according to Class III game options selected by a player.

For example, some implementations of the invention cause the hit frequency of a simulated slot game to change according to the number of paylines played without switching to a different bingo pool. Instead, a multi-card bingo game is provided wherein differing numbers of bingo cards are assigned, depending on the number of paylines selected by a player. In addition to a number of paylines for a simulated slot game, the player's selected Class III game options may involve, for example, a number of hands for a simulated poker game, a number of spots picked for a simulated keno game and/or a number of wagers placed on a simulated roulette game that is provided in accordance with the same paytable of a bingo game.

However, the examples described in greatest detail herein involve bingo games that provide various types of simulated slot games. As a player plays more paylines, he or she is assigned more bingo cards. In some such implementations, the wins for all bingo cards are summed up to form the total bingo game win, which is then represented on the slot game using some or all of the paylines available. Depending on the implementation, there may or may not be a one-to-one correspondence between wins on a single card and wins on a single payline. Several examples of using bingo cards to correspond with Class III game options are described in more detail below, following the Exemplary System Architecture section.

Some implementations provide a system wherein a plurality of electronic gaming machines, each of which is configured for presenting entertaining displays of various Class III game themes, is linked to a single bingo server. By linking many participating electronic gaming machines to a single server, some implementations of the invention allow progressive contributions from all of the participating electronic gaming machines to be pooled into a single progressive jackpot.

Some embodiments of the invention involve gaming machines that are configured with a graphical user interface ("GUI") or the like that allows a player to select a Class III game theme from a plurality of Class III game themes. In some such embodiments, the gaming machine is configured to present any of the proffered Class III game themes.

Alternatively, or additionally, the game theme of a particular networked gaming machine (or a group of networked gaming machines) may be changed according to instructions received from a central system: some gaming networks described herein include a central system that is configured to download game software and data, including but not limited to the underlying bingo patterns, pays and game outcomes, to networked gaming machines. Such gaming networks allow for the convenient provisioning of networked gaming machines.

Moreover, such gaming networks allow additional game themes to be easily and conveniently added, if desired. If a new game theme requires new bingo patterns to match new payout amounts, preferred implementations of the invention allow a new pattern set (or updates to an old pattern set) to be downloaded to all networked gaming machines. Related software, including but not limited to game software, may be downloaded to networked gaming machines. Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes. Some exemplary gaming networks and devices are below.

Exemplary System Architecture

One example of a network topology for implementing some aspects of the present invention is shown in FIG. 1. Those of skill in the art will realize that this exemplary architecture and the related functionality are merely examples and that the present invention encompasses many other such embodiments and methods. Here, for example, a single gaming establishment 105 is illustrated, which is a casino in this example. However, it should be understood that some implementations of the present invention involve multiple gaming establishments.

Gaming establishment 105 includes 16 gaming machines 2, each of which is part of a bank 110 of gaming machines 2. It will be appreciated that many gaming establishments include hundreds or even thousands of gaming machines 2, not all of which are included in a bank 110. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 125, which combines switching and routing functionality in this example) and/or the inclusion of other network devices not shown in FIG. 1. For example, some implementations of the invention include one or more middleware servers disposed between gaming machines 2 and server 130. Such middleware servers can provide various useful functions, including but not limited to the filtering and/or aggregation of data received from bank switches 115, from individual gaming machines and from other player terminals. Some implementations of the invention include load balancing methods and devices for managing network traffic.

Each bank 110 has a corresponding bank switch 115, which may be a conventional bank switch. Each bank switch is connected to server-based gaming ("SBG") server 130 via main network device 125, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 130, License Manager 131, Arbiter 133 and main network device 125 are disposed within computer room 120 of gaming establishment 105. License Manager 131 may be implemented, at least in part, via a server or a similar device. Some exemplary operations of License Manager 131 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 130 can be configured to implement, at least in part, various aspects of the present invention. Some preferred embodiments of SBG server 130 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 131 and main network device 125) are mounted in a single rack with SBG server 130. Accordingly, many or all such devices will sometimes be referenced in the aggregate as an "SBG server." However, in alternative implementations, one or more of these devices is in communication with SBG server 130 but located elsewhere. For example, some of the devices could be mounted in separate racks within computer room 120 or located elsewhere on the network. For example, it can be advantageous to store large volumes of data elsewhere via a storage area network ("SAN").

In some embodiments, these components are SBG server 130 preferably has an uninterruptible power supply ("UPS"). The UPS may be, for example, a rack-mounted UPS module.

Computer room 120 may include one or more operator consoles or other host devices that are configured for communication with SBG server 130. Such host devices may be provided with software, hardware and/or firmware for implementing various aspects of the invention; many of these aspects involve controlling SBG server 130. However, such host devices need not be located within computer room 120. Wired host device 160 (which is a laptop computer in this example) and wireless host device (which is a PDA in this example) may be located elsewhere in gaming establishment 105 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 1A:
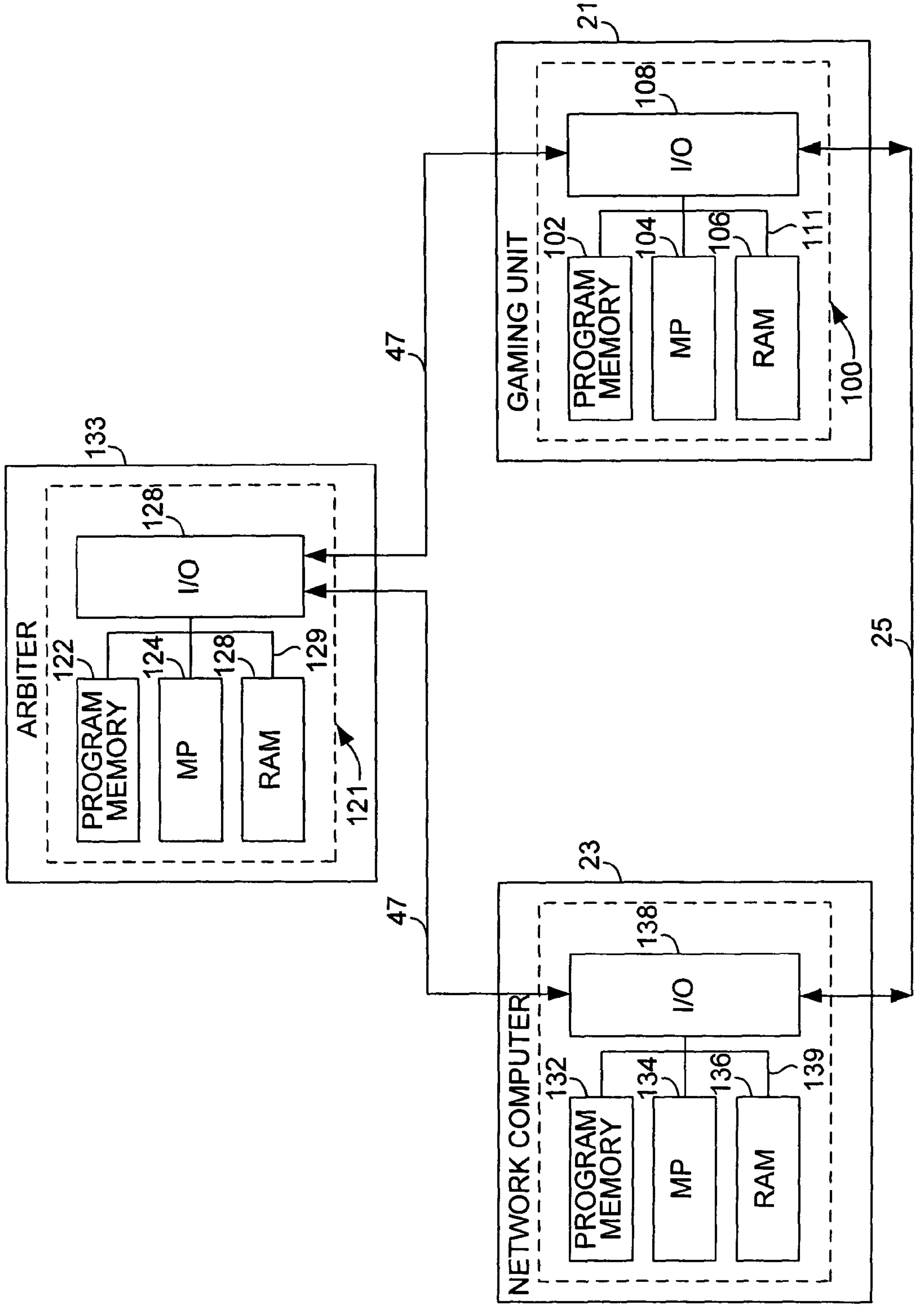
FIG. 1A is a block diagram that illustrates a simplified network topology that illustrates some implementations of an Arbiter.

FIG. 1A is a block diagram of a simplified communication topology between a gaming unit 21, the network computer 23 and the Arbiter 133. Although only one gaming unit 21, one network computer 23 and one Arbiter 133 are shown in FIG. 1A, it should be understood that the following examples may be applicable to different types of network gaming devices within the gaming network 12 beyond the gaming unit 21 and the network computer 23, and may include different numbers of network computers, gaming security arbiters and gaming units. For example, a single Arbiter 133 may be used for secure communications among a plurality of network computers 23 and tens, hundreds or thousands of gaming units 21. Likewise, multiple gaming security arbiters 46 may be utilized for improved performance and other scalability factors.

Referring to FIG. 1A, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 1A as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 1A may each comprise multiple address/data buses, which may be of different types, and there may be an I/O circuit disposed between the address/data buses.

As shown in FIG. 1A, the gaming unit 21 may be operatively coupled to the network computer 23 via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 1, one or more network devices in gaming establishment 105 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 105 and the outside world should only be made with trusted devices via a secure link, e.g., via a virtual private network ("VPN") tunnel. For example, the illustrated connection between SBG 130, gateway 150 and central system 163 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 163 (in this example, IGT.com) to obtain the account information such as the customer's current and prior account status.

Moreover, such a secure connection may be used by the central system 163 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 163 may notify a local SBG server regarding new products and/or product updates. For example, central system 163 may notify a local SBG server regarding updates of new gaming software, gaming software updates, peripheral updates, the status of current gaming software licenses, etc. In some implementations of the invention, central system 163 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 163 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 163 and the gaming establishments.

Examples of Using Bingo Cards to Correspond with Class III Game Options

The present invention provides yet more novel techniques for mapping bingo games to simulated Class III games, assigning the appropriate pays and probabilities, etc. According to preferred implementations of the present invention, the hit frequency of a bingo game can be modulated according to the Class III game options selected by a player for the simulated Class III game. In preferred implementations, this modulation is accomplished by varying the number of bingo cards provided in the underlying bingo game, such that a varying number of bingo cards is assigned to a player according to a number of Class III game options selected by the player. However, in alternative implementations, the number of Class III options in the simulated Class III game depends on the number of bingo cards selected by a player.

Figure 2A:
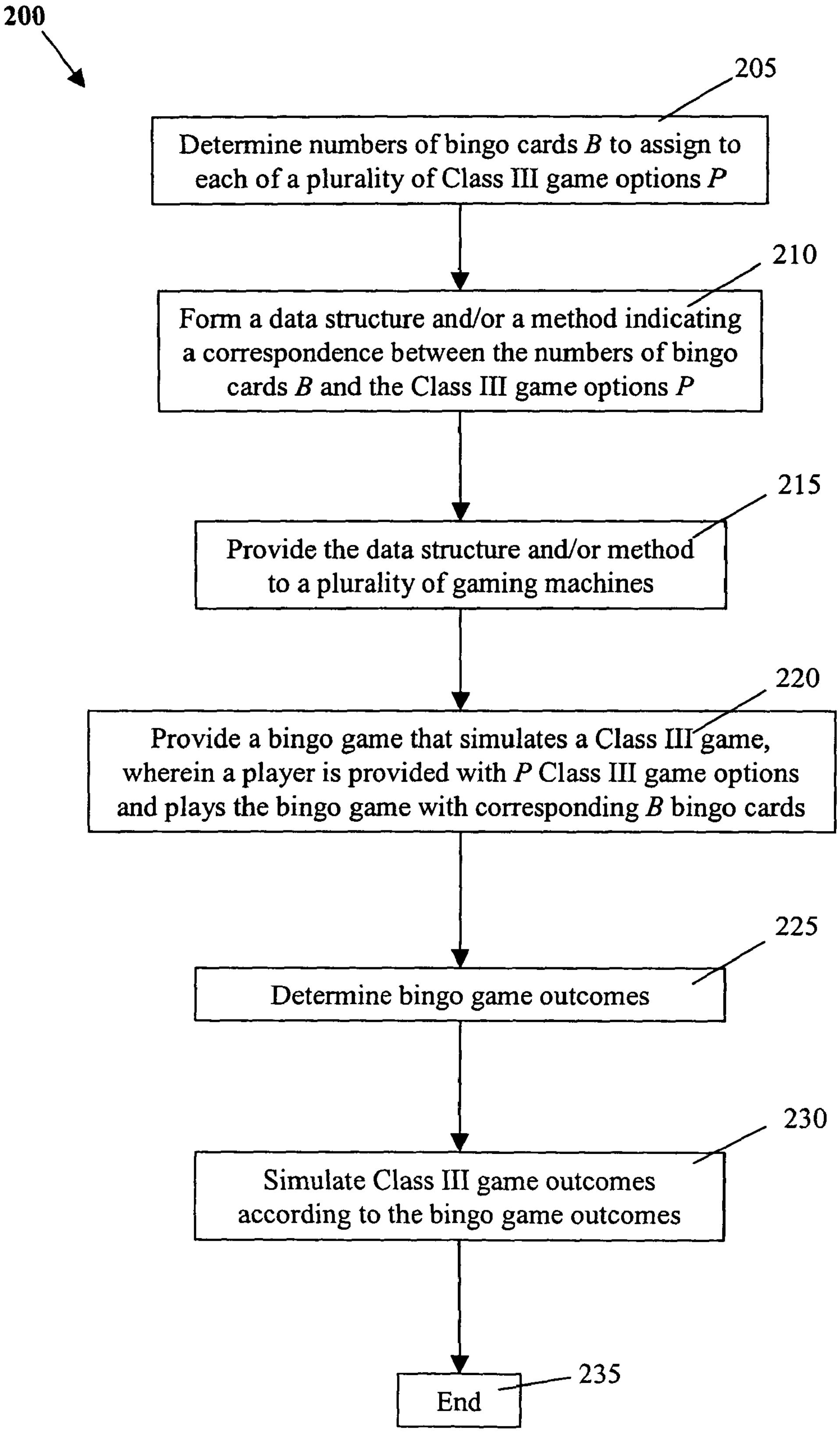
FIG. 2A is a flow chart that outlines one method of the invention.

The flow chart of FIG. 2A outlines the broad contours of method 200 of the invention. Those of skill in the art will appreciate that the steps of the methods described herein, including but not limited to method 200, are not necessarily performed (and in some implementations are not performed) in the order shown. Moreover, some implementations of the methods described herein, including but not limited to method 200, may include more or fewer steps than those shown and/or described. This is true in part because method 200 encompasses more than one set of novel steps.

For example, step 205 alone may involve several steps and may be performed in any of several different ways, some examples of which are discussed in more detail below. Overall, step 205 involves determining numbers of bingo cards B to assign to each of a plurality of Class III game options P. However, the numbers of bingo cards B that are assigned to each of the Class III game options P may vary according to the implementation of the invention.

As previously noted, the Class III game options may be, e.g., the number of paylines in a simulated slot game, a number of hands in a simulated video poker game, a number of spots picked for a simulated keno game or a number of wagers placed on a simulated roulette game. However, in part because of the popularity of slot games, the most commonly referenced Class III game options herein are paylines for simulated slot games.

Although it may be possible to achieve the same win on any bingo card, it is not possible to achieve the same win on every payline of a slot game. Therefore, the multiple bingo cards' hit frequency will generally be greater than the hit frequency for the same number of paylines in a slot game. To adjust for this greater hit frequency, in some implementations of the invention the bingo card to payline ratio is not 1-to-1. For example, the game may assign one bingo card for every 2 or 3 paylines, depending on the desired hit frequency.

According to some implementations of the invention, B is set equal to P. For example, if a player were to play 10 lines in a simulated slot game, 10 bingo cards would be assigned for the underlying bingo game. Such implementations are advantageous because they are simple to implement and are simple to explain to the regulatory authorities and to players.

One such implementation is illustrated in the table of FIG. 3. Here, column 305 of table 300 indicates paylines 1 through 20 of a slot game and column 310 illustrates the hit frequency that corresponds to each payline. Column 315 indicates the number of bingo cards that will be assigned for each payline and column 320 illustrates the hit frequency that corresponds to each number of bingo cards. In the examples described herein, the hit frequency of the 1-bingo-card bingo game is set to be the same as that of the corresponding 1-payline slot game. The hit frequencies for the 1-bingo-card game through the 20-bingo-card game were computed using the following formula:

$$H_f(B)=1-(1-H_f(1))^B \quad \text{Equation (1)}$$

In Equation (1), $H_f(1)$ is the hit frequency of a 1-bingo-card bingo game. $H_f(B)$ is the hit frequency of a bingo game using B bingo cards.

It may be seen from difference column 325 that the difference between the bingo card hit frequency and the slot game hit frequency continues to increase as the number of paylines increases. Accordingly, the maximum difference 330 is attained when 20 bingo cards are used to simulate a 20-payline slot game. The maximum difference of 33.180% and the average difference 335 are both relatively high. This illustrates a disadvantage of this particular implementation.

The differences indicated in difference column 325 were calculated by subtracting the hit frequency for the number of bingo cards from the hit frequency of the corresponding number of paylines. The average and maximum differences are absolute values; this is a distinction without a difference in this example, but will matter in following examples.

In this example, step 210 may be performed according to at least two general methods. In one such method, a data structure is formed that has a one-to-one correspondence between paylines (or other Class III game options) and bingo cards. According to another method, a methodology can be created for indicating this correspondence. For example, a simple software routine could be created that indicates the one-to-one correspondence between paylines (or other Class III game options) and bingo cards. Alternatively, the method could be embodied in hardware or firmware.

An alternative method of performing step 205 will now be described with reference to table 400 of FIG. 4. In this example, step 205 comprises assigning 1 bingo card for up to 2 paylines. For example, one bingo card is used for playing 1 or 2 paylines, two bingo cards are used for playing 3 or 4 paylines, etc. For even-numbered paylines, it can be seen from table 400 that P=2B. For odd-numbered paylines, it can be seen that P=2B−1 and therefore B=(P+1)/2.

Accordingly, step 210 may once again be performed according to at least two general methods. According to a first such method, a data structure is created that associates numbers of paylines and corresponding numbers of bingo cards. According to another method, a methodology can be created for indicating this correspondence. For example, a simple software routine could be created that indicates the above-described correspondence between paylines (or other Class III game options) and bingo cards. Alternatively, the method could be embodied in hardware or firmware.

By comparing FIGS. 3 and 4, it will readily be observed that adding a small bit of complexity to the payline/bingo card mapping process has substantially improved the hit frequency difference between the simulated Class III game and the underlying bingo game. According to difference column 425 of table 400, maximum difference 430 has decreased to 9.187%, as compared with 33.180% in table 300. Moreover, average difference 435 has decreased to only 3.683%, as compared to 15.500% in table 300. This means that the simulated Class III game will have a volatility that is more similar to the real Class III game.

Table 500 of FIG. 5 indicates one method of distributing a wager across multiple bingo cards when using a method like that described with reference to FIG. 4. Column 505 indicates credits bet, which corresponds with the number of Class III options indicated in column 510. Area 515 indicates the number of credits bet on each bingo card. Columns 520 indicate the amount bet on each corresponding bingo card.

For example, table 500 indicates that when a player is playing 5 paylines, two credits will be bet on bingo cards 1 and 2, whereas 1 credit will be bet on bingo card 3. If a player is playing 6 paylines, two credits will be bet on bingo cards 1, 2 and 3. In this example, a maximum of 2 credits is bet on each bingo card. Information regarding how to apportion a wager according to the various methods described herein could be provided according to a data structure like that of table 500 or according to a method performed according to software, etc., as described above.

Referring once again to FIG. 4, an inspection of difference column 425 also reveals that the best match in hit frequencies for this method occurs when playing 6 or 7 bingo cards. In this range, the absolute difference between the hit frequency of the bingo game and the hit frequency of the underlying Class III game is less than 1.5%. Only if a player plays more than 16 paylines does this difference exceed 6%. For a game theme wherein players like to play 16 or fewer paylines, this implementation provides a volatility that is reasonably close to that of the underlying Class III game, yet is based on a method that is relatively straightforward and easy to implement.

However, it will also be observed that when playing 9 or more bingo cards, the difference between the hit frequency of the bingo game and the hit frequency of the underlying Class III game is increasing significantly. It appears that if the underlying Class III game offered higher numbers of paylines (e.g., up to 25 or 30 paylines), this difference would continue to increase.

Accordingly, some implementations of the invention provide methods of mapping bingo cards to paylines wherein D, the absolute value of an average difference between each slot hit frequency and each corresponding bingo hit frequency, is minimized. Alternative implementations of the invention provide methods of mapping bingo cards to paylines wherein a maximum difference between each slot hit frequency and each corresponding bingo hit frequency is minimized.

Other implementations of the invention provide methods of mapping bingo cards to paylines wherein $D_S$, the absolute value of a difference between a slot hit frequency of a selected slot payline and a corresponding bingo hit frequency, is minimized. $D_S$ may correspond to popular number of paylines to play for one or more game themes, as evidenced by gaming history. Similar implementations seek to minimize the difference in hit frequency for predetermined ranges of paylines.

One such implementation will now be described with reference to FIG. 6. Table 600 has been constructed by assigning up to 3 bingo cards per payline. One bingo card is assigned when playing 1, 2 or 3 paylines, whereas two bingo cards are assigned when playing 4, 5 or 6 paylines and so on. It may be seen that this implementation more closely matches the volatilities of the bingo game and the underlying Class III game when playing a relatively small number of lines (e.g., 1 to 4 lines) or a relatively large number of lines (e.g., 16 to 20 lines). This implementation most closely matches the volatilities of the bingo game and the underlying Class III game when playing 19 or 20 lines.

It is apparent from table 600 that B equals P/3 when P is a multiple of 3. When P is not a multiple of 3, B is equal to ⅓ of the multiple of 3 that follows B. In other words, when P is not a multiple of 3, B is equal to N/3, where N is a multiple of 3 greater than P and less than P+3. As with the other methods described herein, the relationships between Class III options and bingo cards may be indicated in a data structure and/or via an algorithm expressed via software, hardware, firmware, or the like.

Table 700 of FIG. 7 indicates a method of distributing a wager across multiple bingo cards when using a method like that described with reference to FIG. 6. Column 705 indicates credits bet, which corresponds with the number of Class III options (here, paylines) indicated in column 710. Area 715 indicates the number of credits bet on each bingo card. Columns 720 indicate the amount bet on each corresponding bingo card.

For example, table 700 indicates that when a player is playing 5 paylines, three credits will be bet on bingo card 1 and two credits will be bet on bingo card 2. If a player is playing 6 paylines, three credits will be bet on bingo cards 1 and 2. In this example, a maximum of 3 credits is bet on each bingo card. Information regarding how to apportion a wager according to the various methods described herein could be provided according to a data structure like that of table 700 or according to a method performed according to software, etc.

Another implementation of the invention will now be described with reference to FIG. 8. Table 800 has been constructed by assigning bingo cards to paylines so as to minimize the maximum and average differences between payline hit frequencies and the hit frequencies of corresponding numbers of bingo cards. This is accomplished by minimizing the difference in each row of the table. For each number of paylines played, the number of bingo cards is selected to minimize the difference between the Class III hit frequency and the bingo cards' hit frequency. The number of bingo cards was not permitted to decrease when the number of paylines increased. By minimizing each individual difference, both the average difference and the maximum difference are minimized.

As noted in difference column 825 of table 800 this difference exceeds 2% only when 3 paylines are being played: as noted in field 830, this maximum difference is 2.229%. Field 835 indicates the average difference of 0.889%. Accordingly, this implementation provides a bingo game having a range of volatilities that closely correspond to those of the underlying Class III game. However, this implementation is more complicated to express in terms of the relationship between B and P. Accordingly, this method is preferably implemented by reference to a data structure. (Step 210.)

Table 900 of FIG. 9 indicates one possible method of distributing a wager across multiple bingo cards when using a method like that described with reference to FIG. 8. Column 905 indicates credits bet, which corresponds with the number of Class III options (here, paylines) indicated in column 910. Area 915 indicates the number of credits bet on each bingo card. Columns 920 indicate the amount bet on each corresponding bingo card.

In this example, a maximum of 3 credits is bet on each bingo card, but this maximum is not attained until 15 or more credits are bet. For example, table 900 indicates that when a player is playing 14 paylines, two credits will be bet on bingo cards 1 through 7. However, if a player is playing 16 paylines, three credits will be bet on bingo cards 1 and 2, and two credits will be bet on bingo cards 3 through 7. Information regarding how to apportion a wager according to the various methods described herein could be provided according to a data structure like that of table 900 or according to a method performed according to software, etc.

Another implementation of the invention will now be described with reference to FIGS. 9 and 10. According to this method, the same X paylines are associated with 1 bingo card, but only multiples of X paylines may be played. In this example, 2 paylines are assigned to 1 bingo card, but only even numbers of paylines may be played.

Referring first to FIG. 10, table 1000 has been constructed by assigning 2 paylines 1005 for every bingo card 1010. Here, a player is limited to playing even numbers of paylines. In this example there is a maximum of 20 paylines, so a player may play 2, 4, 6, 8, 10, 12, 14, 16, 18 or 20 paylines. As in all of the methods described herein, game play could involve selecting a number of bingo cards to play or selecting a number of Class III game options (here, slot paylines). For example, on the bingo interface, the player could select from 1 to 10 cards.

In preferred implementations, all bingo cards played will have the same number of credits on them, whether the player makes his selection from the entertaining slot display or the bingo display. Referring now to table 1100 of FIG. 11, in this example each bingo card 1115 has two credits played on it (see column 1120). Each 2 credits bet 1105 is associated with two paylines 1110 played on the entertaining slot display. The card win multiplier 1125 is 2 in all cases.

Preferred implementations of this method involve games with a number of Class III game options (e.g., paylines) that is evenly divisible by X. For example, a 9-payline slot game could use 1:1, 3:1 or 9:1 ratios of paylines to bingo cards, but not 2:1. A 20-payline slot game could use 1:1, 2:1, 4:1, 5:1, 10:1 or 20:1 ratios of paylines to bingo cards.

Returning now to FIG. 2A, the remaining steps of method 200 will now be described. In step 215, one or more data structures and/or methods are provided to a plurality of gaming machines. The data structures and/or methods may also be provided to one or more servers, depending on the implementation.

In step 220, a bingo game will be provided that simulates a Class III game, wherein a player is provided with P Class III game options (e.g., a selection of paylines that could be played). A bingo game will be provided with a corresponding number B of bingo cards. For example, the individual gaming machines may receive an indication that a player wishes to play P lines in a slot game and provide a bingo game with a corresponding number B of bingo cards. B may be determined by reference to a data structure and/or by applying one or more algorithms, e.g., as described above. The distribution of bets on the B bingo cards may be similarly determined.

In step 225, a bingo outcome is determined and is mapped to a Class III game outcome. For example, Class III game outcomes may be mapped to bingo outcomes as described in the Class II/Class III Applications that have been incorporated by reference herein. In some implementations, only the first card played by each player is eligible to win the game-ending pattern ("Bingo"). When a player wins, his or her win is preferably multiplied by his total bet for all bingo cards, not only the bet for the single bingo card. In such implementations, all players have the same chance at bingo, but each player's bingo win is proportional to his or her total bet. In step 235, the method ends.

Figure 2B:
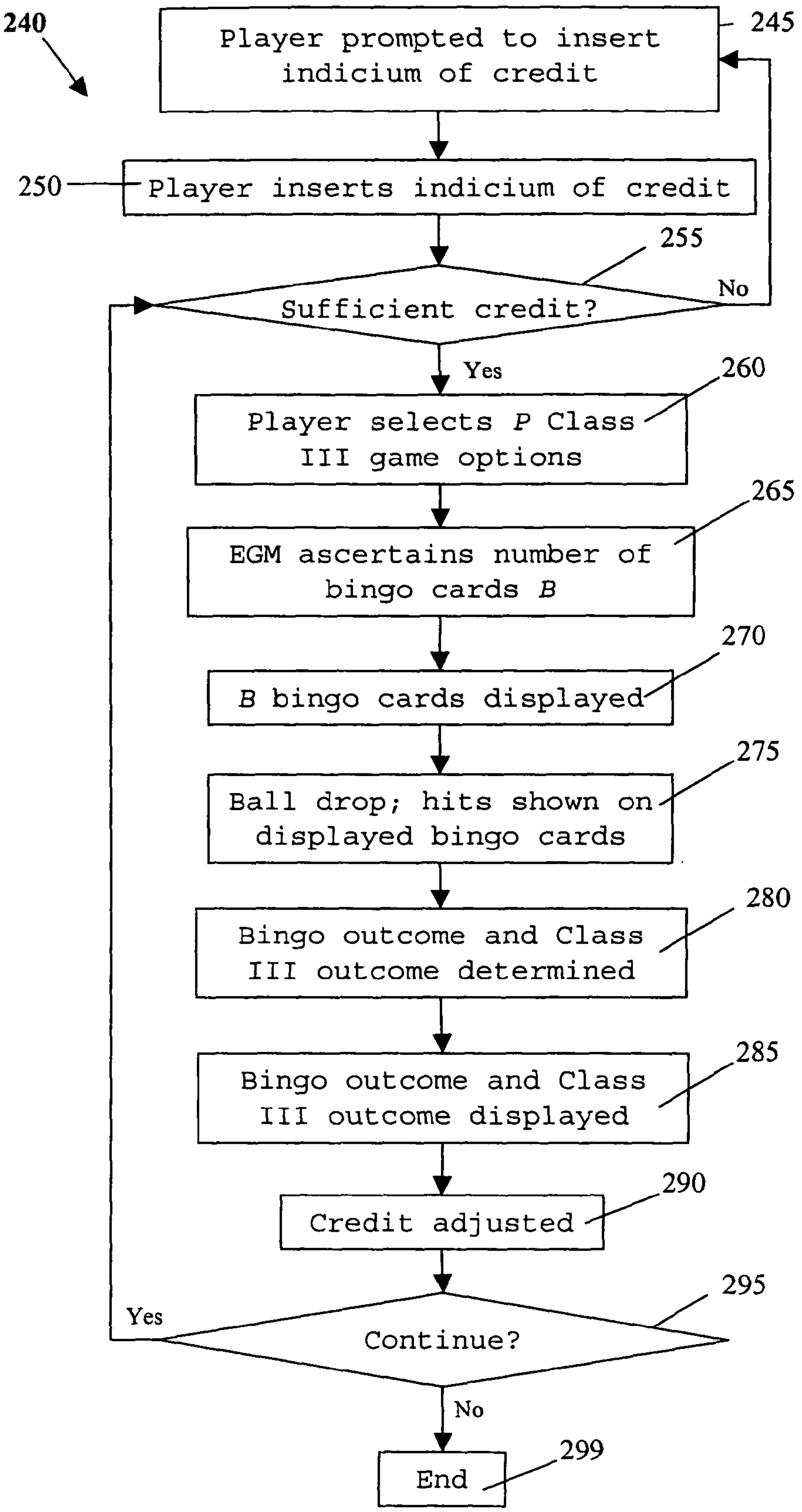
FIG. 2B is a flow chart that outlines another method of the invention.

More details of a particular implementation of the invention will now be described with reference to FIG. 2B. Method 240 begins with step 245, wherein a player is prompted to insert an indicium of credit such as currency, an E-Z Pay ticket or other non-currency indicium, etc. Here, step 245 is part of an attraction sequence of a gaming machine. When a player inserts an indicium of credit (step 250), it is determined whether there is sufficient credit to begin a game. (Step 255.)

In step 260, a player selects a number of Class III game options. In this example, the player selects a desired number of lines to play in a simulated slot game. In some implementations, it may be desirable to determine whether the player has sufficient credit after the player has selected a number of Class III game options.

It is then determined (in this example, by the gaming machine) a number of bingo cards B that corresponds with the selected number of paylines. (Step 265.) The bingo cards are displayed in step 270. In some implementations, the bingo cards may be displayed on a bingo card carousel, as described in the provisional application.

In step 275, random bingo numbers are selected and hits are shown on at least some of the B bingo cards. When a large numbers of bingo cards are being played, the hits on all cards may not be shown in some implementations. In step 280, a bingo outcome and a corresponding Class III outcome are determined. In step 285, these outcomes are displayed. In this example, the outcomes are displayed on separate display devices of the gaming machine, but in alternative implementations they are displayed on the same display device.

In step 290, the player's credit is adjusted according to the game outcome. The player is then prompted to continue. If the player desires to continue, the process returns to step 255, wherein it is determined whether the player has sufficient credit to proceed. If the player does not wish to continue, the player cashes out and the process ends. (Step 299.) The "cash out" process may involve providing a ticket to the player (or the like) in lieu of cash.

Figure 12:
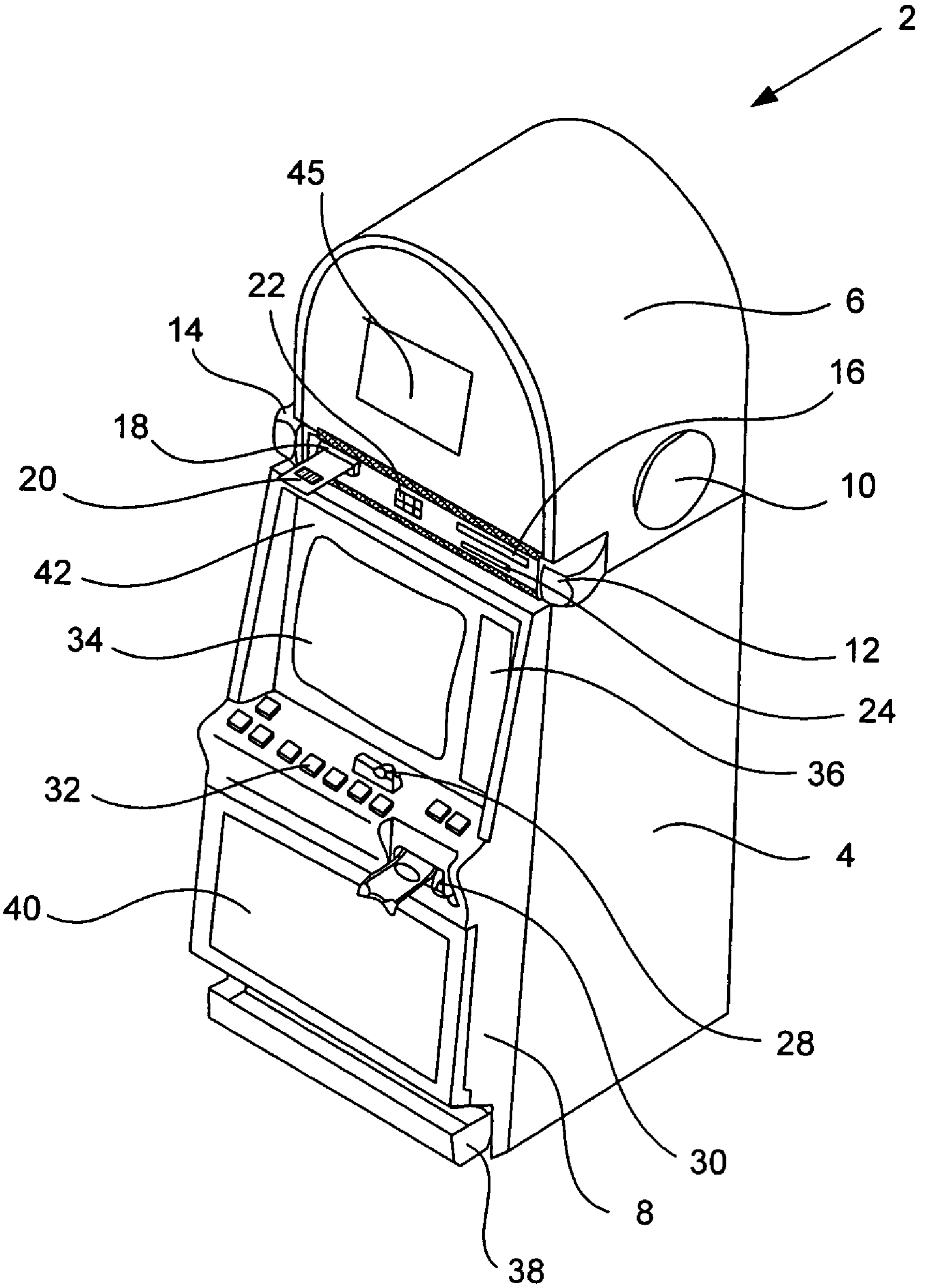
FIG. 12 illustrates a gaming machine that may be configured according to some aspects of the invention.

Turning next to FIG. 12, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 12. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 12, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 13:
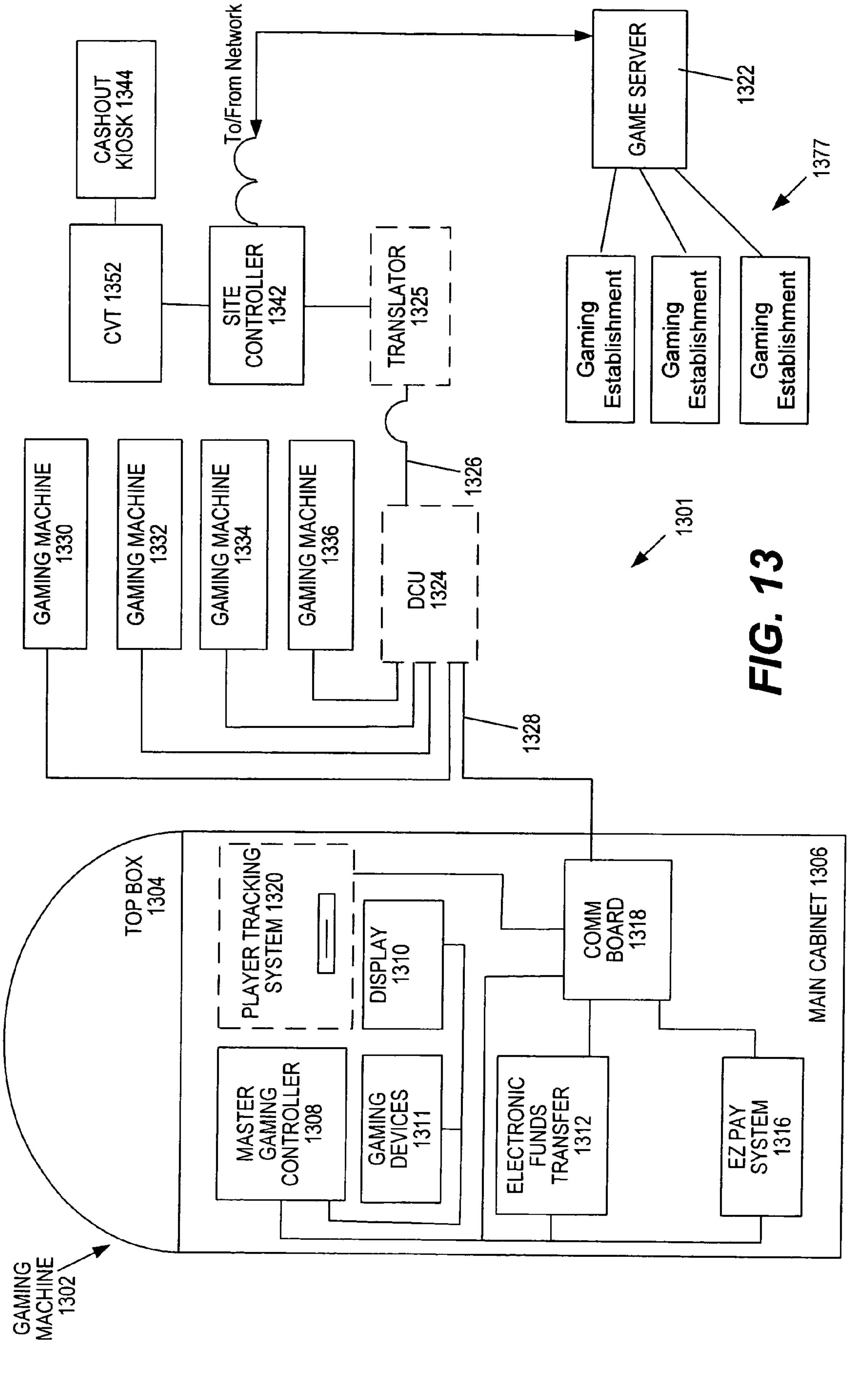
FIG. 13 illustrates a gaming machine and a gaming network that may be configured according to some aspects of the invention.

A gaming network that may be used to implement additional methods performed in accordance with embodiments of the invention is depicted in FIG. 13. Gaming establishment 1301 could be any sort of gaming establishment, such as a casino, a card room, an airport, a store, etc. In this example, gaming network 1377 includes more than one gaming establishment, all of which are networked to game server 1322.

Here, gaming machine 1302, and the other gaming machines 1330, 1332, 1334, and 1336, include a main cabinet 1306 and a top box 1304. The main cabinet 1306 houses the main gaming elements and can also house peripheral systems, such as those that utilize dedicated gaming networks. The top box 1304 may also be used to house these peripheral systems.

The master gaming controller 1308 controls the game play on the gaming machine 1302 according to instructions and/or game data from game server 1322 or stored within gaming machine 1302 and receives or sends data to various input/output devices 1311 on the gaming machine 1302. In one embodiment, master gaming controller 1308 includes processor(s) and other apparatus of the gaming machines described above in FIGS. 6 and 7. The master gaming controller 1308 may also communicate with a display 1310.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1308 may also communicate with EFT system 1312, EZPay™ system 1316 (a proprietary cashless ticketing system of the present assignee), and player tracking system 1320. The systems of the gaming machine 1302 communicate the data onto the network 1322 via a communication board 1318.

It will be appreciated by those of skill in the art that embodiments of the present invention could be implemented on a network with more or fewer elements than are depicted in FIG. 13. For example, player tracking system 1320 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 1324 and translator 1325 are not required for all gaming establishments 1301. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1342 provides this function for gaming establishment 1301. Site controller 1342 is connected to a central system and/or other gaming establishments via one or more networks, which may be public or private networks. Among other things, site controller 1342 communicates with game server 1322 to obtain game data, such as ball drop data, bingo card data, etc.

In the present illustration, gaming machines 1302, 1330, 1332, 1334 and 1336 are connected to a dedicated gaming network 1322. In general, the DCU 1324 functions as an intermediary between the different gaming machines on the network 1322 and the site controller 1342. In general, the DCU 1324 receives data transmitted from the gaming machines and sends the data to the site controller 1342 over a transmission path 1326. In some instances, when the hardware interface used by the gaming machine is not compatible with site controller 1342, a translator 1325 may be used to convert serial data from the DCU 1324 to a format accepted by site controller 1342. The translator may provide this conversion service to a plurality of DCUs.

Further, in some dedicated gaming networks, the DCU 1324 can receive data transmitted from site controller 1342 for communication to the gaming machines on the gaming network. The received data may be, for example, communicated synchronously to the gaming machines on the gaming network.

Here, CVT 1352 provides cashless and cashout gaming services to the gaming machines in gaming establishment 1301. Broadly speaking, CVT 1352 authorizes and validates cashless gaming machine instruments (also referred to herein as "tickets" or "vouchers"), including but not limited to tickets for causing a gaming machine to display a game result and cash-out tickets. Moreover, CVT 1352 authorizes the exchange of a cashout ticket for cash. These processes will be described in detail below. In one example, when a player attempts to redeem a cash-out ticket for cash at cashout kiosk 1344, cash out kiosk 1344 reads validation data from the cashout ticket and transmits the validation data to CVT 1352 for validation. The tickets may be printed by gaming machines, by cashout kiosk 1344, by a stand-alone printer, by CVT 1352, etc. Some gaming establishments will not have a cashout kiosk 1344. Instead, a cashout ticket could be redeemed for cash by a cashier (e.g. of a convenience store), by a gaming machine or by a specially configured CVT.

Figure 14:
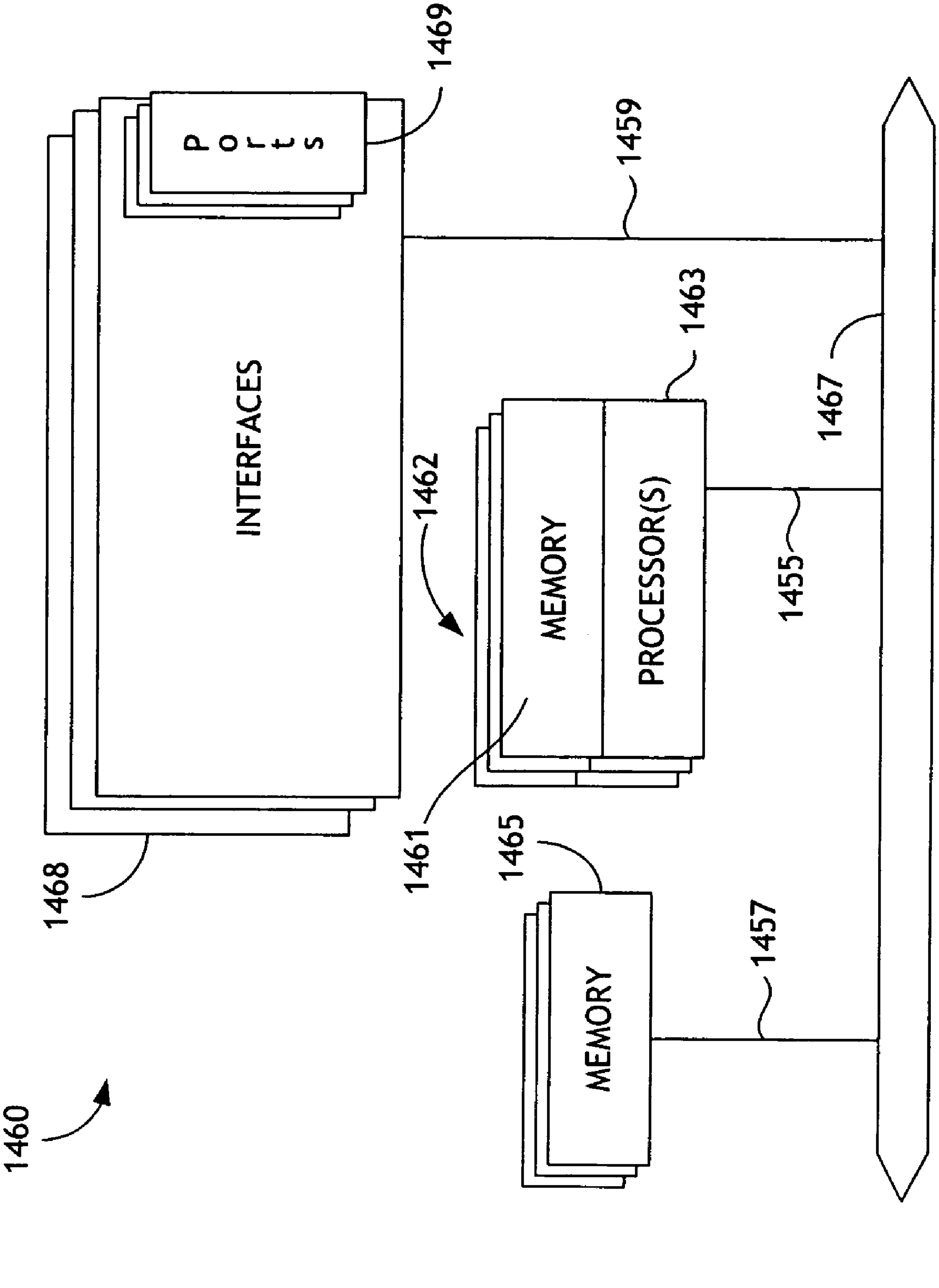
FIG. 14 illustrates a network device that may be configured according to some aspects of the invention.

FIG. 14 illustrates an example of a network device that may be configured for implementing some methods of the present invention. Network device 1460 includes a master central processing unit (CPU) 1462, interfaces 1468, and a bus 1467 (e.g., a PCI bus). Generally, interfaces 1468 include ports 1469 appropriate for communication with the appropriate media. In some embodiments, one or more of interfaces 1468 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1468 control such communications-intensive tasks as encryption, decryption, compression, decompression, packetization, media control and management. By providing separate processors for the communications-intensive tasks, interfaces 1468 allow the master microprocessor 1462 efficiently to perform other functions such as routing computations, network diagnostics, security functions, etc.

The interfaces 1468 are typically provided as interface cards (sometimes referred to as "linecards"). Generally, interfaces 1468 control the sending and receiving of data packets over the network and sometimes support other peripherals used with the network device 1460. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1462 may be responsible for implementing specific functions associated with the functions of a desired network device. According to some embodiments, CPU 1462 accomplishes all these functions under the control of software including an operating system and any appropriate applications software.

CPU 1462 may include one or more processors 1463 such as a processor from the Motorola family of microprocessors or the MIPS family of microprocessors. In an alternative embodiment, processor 1463 is specially designed hardware for controlling the operations of network device 1460. In a specific embodiment, a memory 1461 (such as non-volatile RAM and/or ROM) also forms part of CPU 1462. However, there are many different ways in which memory could be coupled to the system. Memory block 1461 may be used for a variety of purposes such as, for example, caching and/or storing data, programming instructions, etc.

Regardless of the network device's configuration, it may employ one or more memories or memory modules (such as, for example, memory block 1465) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 14 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 14) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A gaming machine, comprising:

apparatus, including a display device, a processor and a user input device, the apparatus configured to do the following:

provide a bingo game that simulates a slot game, a simulated slot game having a plurality of P possible paylines selectable by a player for changing a hit frequency, wherein the hit frequency is a frequency of obtaining an award; and provide from 1 to B bingo cards for playing the bingo game, wherein the number of bingo cards depends on a number of paylines selected by a player, wherein:

each payline of the simulated slot game corresponds with a slot hit frequency;

each bingo card corresponds with a bingo hit frequency;

an absolute value of an average difference between each slot hit frequency and each corresponding bingo hit frequency equals D; and the providing step comprises referencing a data structure wherein paylines are associated with bingo cards such that D is minimized.

2. A gaming machine configured for providing a bingo game that simulates a slot game, the gaming machine comprising:

a network interface;

a first display device for displaying the bingo game;

a second display device for displaying a simulated slot game;

a pay device for accepting indicia of credit;

at least one user input device; and at least one logic device configured to perform the following steps:

receive an indication of sufficient credit for the bingo game from the pay device;

receive an indication from a user input device to play a plurality of P paylines in the simulated slot game;

ascertain a number B of bingo cards for the bingo game, wherein B is ascertained according to P;

control the first display device to display B bingo cards;

control the first display device to indicate hits on the B bingo cards according to bingo game data received via the network interface;

determine a first outcome of the bingo game;

control the first display device to display the first outcome;

determine a second outcome of the slot game; and control the second display device to display the second outcome, wherein:

each payline of the slot game corresponds with a slot hit frequency;

each bingo card corresponds with a bingo hit frequency;

an absolute value of an average difference between each slot hit frequency and each corresponding bingo hit frequency equals D; and the ascertaining step comprises referencing a data structure wherein paylines are associated with bingo cards such that D is minimized.

3. A gaming machine configured for providing a bingo game that simulates a slot game, the gaming machine comprising:

a network interface;

a first display device for displaying the bingo game;

a second display device for displaying a simulated slot game;

a pay device for accepting indicia of credit;

at least one user input device; and at least one logic device configured to perform the following steps:

receive an indication of sufficient credit for the bingo game from the pay device:

receive an indication from a user input device to play a plurality of P paylines in the simulated slot game;

ascertain a number B of bingo cards for the bingo game, wherein B is ascertained according to P;

control the first display device to display B bingo cards;

control the first display device to indicate hits on the B bingo cards according to bingo game data received via the network interface;

determine a first outcome of the bingo game;

control the first display device to display the first outcome;

determine a second outcome of the slot game; and control the second display device to display the second outcome, wherein:

each payline of the slot game corresponds with a slot hit frequency;

each bingo card corresponds with a bingo hit frequency;

an absolute value of a difference between a slot hit frequency of a selected slot payline and a corresponding bingo hit frequency equals $D_s$; and the ascertaining step comprises referencing a data structure wherein paylines are associated with bingo cards such that $D_s$ is minimized.

4. A gaming method, comprising:

providing, at a wager gaming machine, a bingo game that simulates a slot game having a plurality of P possible paylines; and providing, at the wager gaming machine, from 1 to B bingo cards for playing the bingo game, a number of bingo cards provided depending on a number of paylines selected by a player, wherein:

each payline of the simulated slot game corresponds with a slot hit frequency;

each bingo card corresponds with a bingo hit frequency;

an absolute value of an average difference between each slot hit frequency and each corresponding bingo hit frequency equals D; and the providing step comprises referencing a data structure wherein paylines are associated with bingo cards such that D is minimized.

5. Software embodied in a non-transitory medium, the software comprising instructions for controlling one or more devices in a gaming system to perform the following steps:

provide a bingo game that simulates a slot game having a plurality of P possible paylines selectable by a player for changing a hit frequency, wherein the hit frequency is a frequency of obtaining an award; and provide from 1 to B bingo cards for playing the bingo game, a number of bingo cards provided depending on a number of paylines selected by a player, wherein:

each payline of the simulated slot game corresponds with a slot hit frequency;

each bingo card corresponds with a bingo hit frequency;

an absolute value of an average difference between each slot hit frequency and each corresponding bingo hit frequency equals D; and the providing step comprises referencing a data structure wherein paylines are associated with bingo cards such that D is minimized.

6. A gaming method, comprising:

determining, by a server, numbers of bingo cards to assign to each of a plurality of paylines selectable by a player for modulating a hit frequency in a simulated slot game, wherein the hit frequency is a frequency of obtaining an award; and forming, by the server, a data structure indicating a correspondence between the numbers of bingo cards and each of the paylines, wherein:

each payline of the simulated slot game corresponds with a slot hit frequency;

each bingo card corresponds with a bingo hit frequency;

an absolute value of an average difference between each slot hit frequency and each corresponding bingo hit frequency equals D; and the forming step comprises forming a data structure wherein paylines are associated with bingo cards such that D is minimized.

7. A gaming device, comprising:

a memory; and a processor configured to do the following:

determine numbers of bingo cards to assign to each of a plurality of paylines selectable by a player for modulating a hit frequency in a simulated slot game, wherein the hit frequency is a frequency of obtaining an award; and form a data structure in the memory, the data structure indicating a correspondence between the numbers of bingo cards and each of the paylines, wherein:

each payline of the simulated slot game corresponds with a slot hit frequency;

each bingo card corresponds with a bingo hit frequency;

an absolute value of an average difference between each slot hit frequency and each corresponding bingo hit frequency equals D; and the forming step comprises forming the data structure wherein paylines are associated with bingo cards such that D is minimized.

* * * * *